United States Patent
Zhang et al.

(10) Patent No.: US 10,058,959 B2
(45) Date of Patent: Aug. 28, 2018

(54) METHOD FOR REMANUFACTURING ULTRA-LARGE COPPER NUT

(71) Applicant: Wuhan Kaiming High Tech Co., Ltd., Wuhan, Hubei (CN)

(72) Inventors: Kaiming Zhang, Hubei (CN); Xubing Chen, Hubei (CN); Jiang Li, Hubei (CN); Zhigang Fu, Hubei (CN); Mingxi Li, Hubei (CN); Hongbo Zhao, Hubei (CN); Guanglei Chen, Hubei (CN); Sigu Zhu, Hubei (CN); Zhitian Liu, Hubei (CN); Li Lin, Hubei (CN); Wenbin Luo, Hubei (CN); Fuquan Liu, Hubei (CN); Hejiao Xiao, Hubei (CN); Daoguo Zhou, Hubei (CN); Yide Liao, Hubei (CN); Zhenlin Yang, Hubei (CN); Ganggui Hu, Hubei (CN); Guilin Zheng, Hubei (CN); Weiguo Wu, Hubei (CN); Chengwu Liu, Hubei (CN)

(73) Assignee: Wuhan Kaiming High Tech Co., Ltd., Wuhan, Hubei (CN)

( * ) Notice: Subject to any disclaimer, the term of this patent is extended or adjusted under 35 U.S.C. 154(b) by 581 days.

(21) Appl. No.: 14/880,146

(22) Filed: Oct. 9, 2015

(65) Prior Publication Data
US 2016/0031048 A1 Feb. 4, 2016

(30) Foreign Application Priority Data
Jul. 17, 2015 (CN) .......................... 2015 1 0418824

(51) Int. Cl.
F16B 37/00 (2006.01)
B23P 6/00 (2006.01)
(Continued)

(52) U.S. Cl.
CPC ................ B23P 6/00 (2013.01); B23G 9/009 (2013.01); B23P 17/00 (2013.01); B25B 27/143 (2013.01);
(Continued)

(58) Field of Classification Search
CPC ......... Y10T 29/49732; Y10T 29/49739; Y10T 29/49744; Y10T 29/49748;
(Continued)

(56) References Cited

FOREIGN PATENT DOCUMENTS

CN 1872488 A * 12/2006
CN 101700594 A * 5/2010

* cited by examiner

*Primary Examiner* — Sarang Afzali
*Assistant Examiner* — Ruth G Hidalgo-Hernandez

(57) ABSTRACT

A method for remanufacturing an ultra-large copper nut includes steps of: step (1) coarsening treatment; step (2) purifying treatment; step (3) detecting a material of the ultra-large copper nut; step (4) sleeving a thermal insulation device; step (5) preheating the ultra-large copper nut; step (6) melting-deposition shaping; step (7) post-processing; and step (8) detecting. The method of the present invention simultaneously utilizes water, electricity, gas, fire and machine and performs melting-deposition on materials by simultaneously supplying water, electricity, gas, fire and machine according to the designed requirements. The method of the present invention solves problems of large thickness abrasion and remediation of fracture components. The method of the present invention is capable of preventing the ultra-large copper nut from deformation and collapse and is a feasible remanufacturing for decreasing the huge economic loss caused by damages of expensive ultra-large of nonferrous metals.

10 Claims, 7 Drawing Sheets

(51) Int. Cl.
*B23P 17/00* (2006.01)
*B25B 27/14* (2006.01)
*B23G 9/00* (2006.01)

(52) U.S. Cl.
CPC ......... *F16B 37/00* (2013.01); *Y10T 29/49718* (2015.01); *Y10T 29/49732* (2015.01); *Y10T 29/49739* (2015.01); *Y10T 29/49744* (2015.01); *Y10T 29/49748* (2015.01); *Y10T 29/49881* (2015.01)

(58) Field of Classification Search
CPC ........ Y10T 29/49881; Y10T 29/49718; B23G 9/00; B23G 9/006; B23G 9/009; B25B 27/143; B23P 6/00; B23P 17/00; F16B 37/00
See application file for complete search history.

METHOD FOR REMANUFACTURING ULTRA-LARGE COPPER NUT

CROSS REFERENCE OF RELATED APPLICATION

The present application claims priority under 35 U.S.C. 119(a-d) to CN 201510418824.5, filed Jul. 17, 2015.

BACKGROUND OF THE PRESENT INVENTION

Field of Invention

The present invention relates to a remediation method, and more particularly to a technique for remanufacturing an ultra-large copper nut.

Description of Related Arts

Currently, the abrasion, fracture and pitting corrosion of ultra-large copper nuts are beyond repair. Research institutions of all over the world have been trying to repair, but without success so far. The ultra-large copper nuts which are abrasive, fractured or pitting corrosive can only be replaced, and the dreadful waste thereof is really a pity.

Since copper has a high heat transfer rate, the heated temperature of large components is difficult to control, and particularly components with large volume are even harder to control. A low temperature does not work, and a high temperature is easy to lead to collapse and deformation by melting. Exotemp easily occurs on the head of the flame spraying gun to cause danger. In particular, the copper nut with a large diameter is even more difficult to control. Thus, a set of technique which combines water, electricity, gas, fire and machine and has multiple purposes and multiple functions should be designed. How to arrange the technique reasonably is a difficult problem and a key for the method for remanufacturing the ultra-large copper nut.

The present invention is designed to combine water, electricity, gas, fire and machine, so as to form a vertical crossing multifunction technique, which solves the problem in the world of restoring the ultra-large copper components. The method of the present invention is an issue in the remanufacturing technique. The method of the present invention is not only an innovation in composite technique but also a magic weapon for economic circulation, resource and consumption reduction, environmental protection and waste reuse.

SUMMARY OF THE PRESENT INVENTION

In order to solve the problems mentioned above, the present invention provides a technique for remanufacturing an ultra-large copper nut. The present invention drops the huge economic losses caused by the damage of expensive ultra-large components made of nonferrous metals to a lowest point and is a practical remanufacture technique.

Accordingly, in order to achieve the technical effects mentioned above, a technical solution of the present invention is as follows.

A method for remanufacturing an ultra-large copper nut, comprises following steps of:

step (1) coarsening treatment: washing an oil contamination layer on the ultra-large copper nut with diesel oil, washing screw teeth surface and a dedendum of the ultra-large copper nut with gasoline; removing oil contamination in an oil hole and washing the oil hole with gasoline; and performing grinding and coarsening on screw teeth of the ultra-large copper nut;

step (2) purifying treatment: comprising washing the screw teeth of the ultra-large copper nut with acetone or sodium hydroxide solution, and then washing the screw teeth of the ultra-large copper nut with sodium carbonate solution;

step (3) detecting a material of the ultra-large copper nut comprising detecting the material of the ultra-large copper nut and determining chemical composition of a welding wire according to the material of the ultra-large copper nut;

step (4) sleeving a thermal insulation device comprising sleeving the thermal insulation device outside the ultra-large copper nut;

step (5) preheating the ultra-large copper nut comprising preheating the ultra-large copper nut by a fuel gas preheating method comprising steps of:

step (5.1) heating the ultra-large copper nut for 4 hours at a heating rate of 20° C. per hour; and step (5.2) heating the ultra-large copper nut to a temperature at a range of 200° C.-300° C. at a heating rate of 50° C. per hour, preserving the temperature, wherein a sum of a heating time and a preserving time is 4 hours;

step (6) melting-deposition shaping: comprising welding a welding wire and/or a weld assembly on a damaged region and/or a fracture of the ultra-large copper nut, so as to recover a geometrical shape of the ultra-large copper nut and achieve melting-deposition shaping, wherein the welding is performed under protection of an argon gas, and a purity of the argon gas is greater that or equal to 99.98%;

step (7) post-processing: comprising performing machining and abrasive machining on the ultra-large copper to meet operating requirement, and restoring oil hole which is blocked; and step (8) detecting comprising: performing magnetic defect detecting, ultrasonic testing, hardness detecting and geometric parameter detecting on the ultra-large copper nut.

Preferably, the step (8) further comprises a step of meshing the ultra-large copper nut which passes detections in step (8) with a hydraulic screw lever and performing acceptance tests.

Preferably, in the step (4), an insulation separator is provided on a bottom of the thermal insulation device; the thermal insulation device positions a bottom of the ultra-large copper nut via an internal footing, a top of the ultra-large copper nut is fixed by a puller bolt, an aluminium backing plate is provided between the puller bolt and the ultra-large copper nut; and the thermal insulation device is made of iron.

Preferably, in the step (5), a ventilating fan for discharging harmful gas is provided on a top portion of the ultra-large copper nut; fuel gases utilized are acetylene and oxygen, the fuel gases are injected to a working table via centre-packed rotating joints on a plurality of flame spraying guns, an amount of the flame spraying guns is four, positions of the four flame spraying guns quarter cross sections of an internal wall of the ultra-large copper nut, and a water circulation cooling device is provided on the flame spraying gun.

Preferably, in the sub-step (5.2) of the step (5), the ultra-large copper nut is heated to 280° C. and then performed with heat preservation.

Preferably, in the step (6), a welding method is a TIG (Tungsten Inert Gas) pulse welding method or a MIG (Metal Inert-gas Welding) pulse welding method, a welding wire is a nickel-aluminium bronze welding wire or a silicon bronze welding wire, a welding torch is fixed on a guide arm having an angle of 45°, an angle of the welding torch is adjustable, the welding torch is connected with a guide wheel for controlling operation track of the welding torch, a duct for argon and a water circulation cooling device are provided on the welding torch.

Preferably, in the step (6), the welding method is the TIG pulse welding method; and the welding wire is the nickel-aluminium bronze welding wire.

Preferably, in the step (6), the ultra-large copper nut is installed on a positioner for rotating and angular correcting while welding; during welding, a rotational velocity of the ultra-large copper nut is 260 mm/min, a welding width of a welding torch is 10 mm, a voltage of a deposition line is 20V, a current is at a range of 201.6-202.4 mA and a deposited linear velocity is 260 mm/min Preferably, in the step (6), while welding, a purity of the argon gas is 99.98%, the argon gas is spurted via a nozzle, an aperture of the nozzle is 8 mm and a flow of the argon gas is 150 ml/min.

Preferably, in the step (2), a concentration of the sodium hydroxide solution is at a range of 8%-10%, a concentration of the sodium carbonate solution is at a range of 8%-10%; and in the step (6), the welding adopts a horizontal-rotating surfacing welding.

The method of the present invention simultaneously utilizes water, electricity, gas, fire and machine and performs melting-deposition on materials by simultaneously supplying water, electricity, gas, fire and machine according to the designed requirements. The method of the present invention solves problems of large thickness abrasion and remediation of fracture components. The method of the present invention is capable of preventing the ultra-large copper nut from deformation and collapse and is a feasible remanufacturing for decreasing the huge economic loss caused by damages of expensive ultra-large of nonferrous metals. The method of the present invention is widely suitable for large scaled copper components all over the world.

These and other objectives, features, and advantages of the present invention will become apparent from the following detailed description, the accompanying drawings, and the appended claims.

DETAILED DESCRIPTION OF THE PREFERRED EMBODIMENT

A method for remanufacturing an ultra-large copper nut comprises steps as follows.

Figure 1:
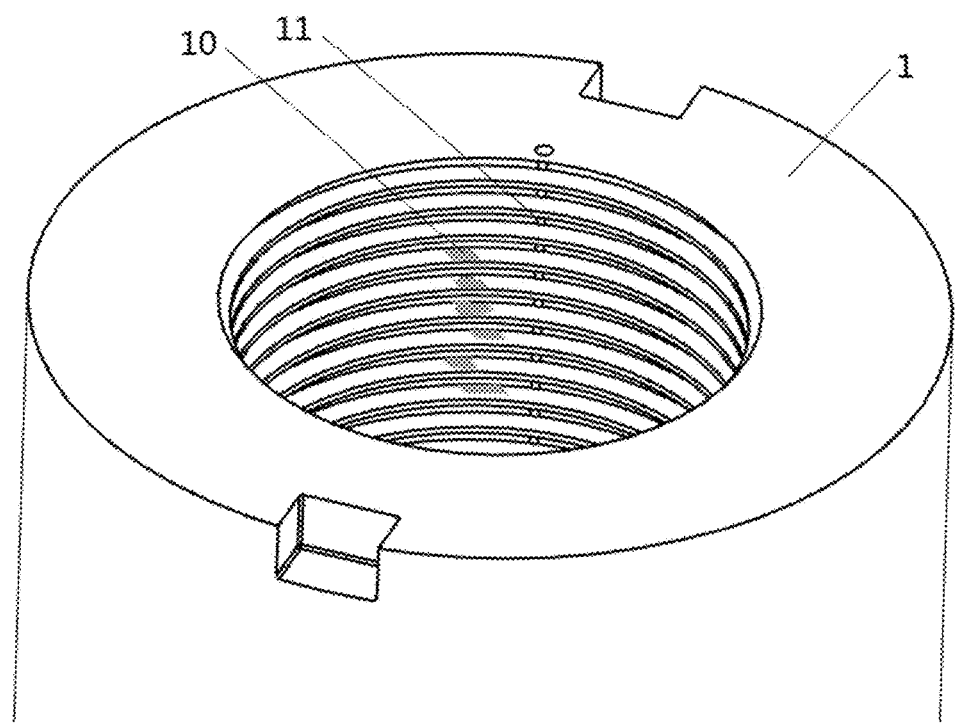
FIG. 1 is an abrasion diagram of an ultra-large copper nut.

Referring to FIG. 1 of the drawings, an ultra-large copper nut 1 has a weight of 38 tonnes, a tool weight of 3 tonnes, a center height of 3600 mm, wherein an abrasion loss on an abrasion 10 is at a range of 6-8 mm. A restoration method comprises steps as follows.

Step (1) Coarsening Treatment:

An oil contamination layer on an ultra-large copper nut 1 is washed with diesel oil, a screw tooth surface and a dedendum of the ultra-large copper nut 1 are washed with gasoline. Oil contamination in an oil hole 11 is removed and the oil hole 11 is washed with gasoline. Grinding and coarsening is performed on screw teeth of the ultra-large copper nut 1.

Step (2) Purifying Treatment:

The screw teeth of the ultra-large copper nut 1 is washed with acetone or sodium hydroxide solution, and then the screw teeth of the ultra-large copper nut 1 is washed with sodium carbonate solution, wherein a concentration of the sodium hydroxide solution is 8% and a concentration of the sodium carbonate solution is 8%.

Step (3) Detecting a Material of the Ultra-large Copper Nut 1:

The material of the ultra-large copper nut 1 is detected and chemical composition of a welding wire is determined according to the materials of the ultra-large copper nut 1. The material of the ultra-large copper nut 1 is as follows:

| Symbol of elements | Element names | Mass fraction |
| --- | --- | --- |
| Cu | Copper | 67.19% |
| Zn | Zinc | 20.20% |
| Al | Aluminum | 5.00% |
| Mn | Manganese | 3.99% |
| Fe | Iron | 3.48% |
| Ni | Nickel | 0.15% |

After detection and analysis, a weight percentage content of Zn reaches 20%. Zinc is a metal with a color of blue and white, a density of 7.14 g/cm', a melting point of 419.5° C. and a boiling point of 906° C. Thus, the Zinc turns into a steam state and fading away with smoke. Yellow brass is a copper-zinc alloy and a melting point of the yellow brass varies with content of Zinc. A melting point of the copper nut is 934° C.

Material selecting is the key of the whole technique. If the materials are not combined appropriately and the quality can not meet the technical requirement, defects such as pore, slag inclusion and cracks are generated. Of course, technological parameters are important as well, such as proper application of deposition line velocity and deposition line energy.

Evaporation of the zinc destroys the protective effect of the argon gas, so a large diameter of nozzle and a high flow of argon gas should be selected while welding the ultra-large copper nut. In order to decrease evaporation of zinc, the welding wire can be welded on a weldment during the operation. Striking arc and keeping electric arc on the welding wire, so as to avoid direct effect of the electric arc on a base material. The base material mainly depends on heat transfer of metal in a molten pool to heat and melt. The welding wire and the base material have similar chemical component. A purity of the argon gas is equal to or greater than 99.98%. The material selection is very important.

Ingredient List of the Welding Wire

| Symbol of elements | Element names | Mass fraction |
| --- | --- | --- |
| Al | Aluminum | 8.06% |
| Fe | Iron | 1.88% |
| Mn | Manganese | 1.81% |
| Ni | Nickel | 1.96% |
| Pb | Plumbum | 0.004% |
| Si | Silicon | 0.05% |
| Zn | Zinc | 0.005% |
| Cu | Copper | 86.23% |

Two types of welding wires can be selected as follows.

(1) Silicon Bronze Welding Wire

Silicon bronze is a kind of bronze having a main alloying element of silicon. Besides Silicon, the industrial applied Silicon bronze further comprises a small amount of Manganese, Nickel, Zinc and other elements. Silicon is a limited solid solution in copper, and has a maximum solubility of 5.3% when the temperature is 852° C. The maximum solubility decreases with drop of temperature. However, Silicon has a low age hardening effect in copper and an intensive heat treatment is generally not performed.

(2) Nickel-aluminium bronze welding wire Chemical composition: $AL_8 Ni_2$ CuRem Features and usage: melting point 1038° C.-1045° C., wearable and thermostable.

Since nickel has a good ductility, adding nickel to copper welding wire is particularly suitable for multilayer welding on multi-components alloy comprising copper and aluminum. Thus selecting this kind of welding wire is appropriate as in the example.

Figure 2:
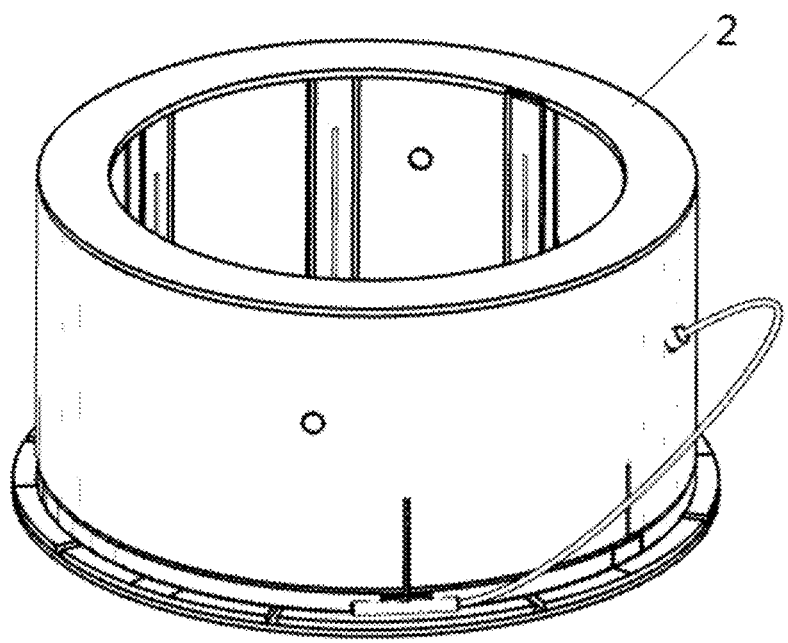
FIG. 2 is a schematic view of putting the ultra-large copper nut into an attemperator.
Figure 3:
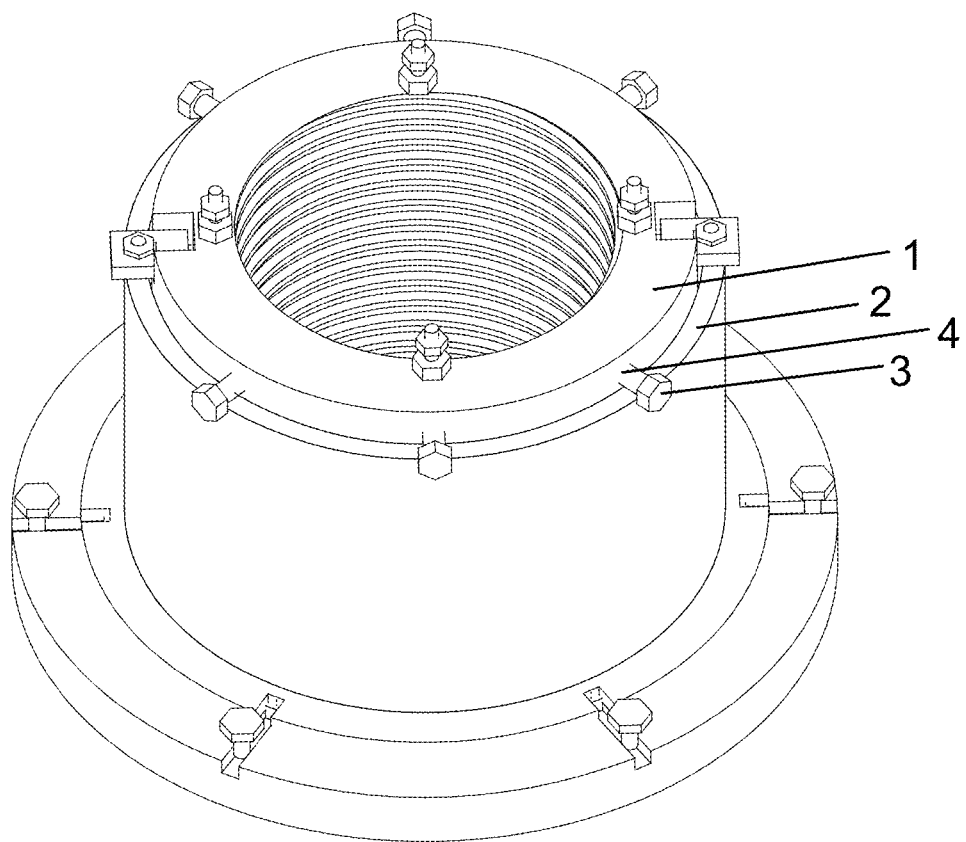
FIG. 3 is a schematic view of fixing the ultra-large copper nut in the attemperator.

Step (4):

As shown in FIG. 2, an attemperator 2 is designed and manufactured. As shown in FIG. 3, an insulation separator is provided on a bottom of the thermal insulation device 2; the thermal insulation device 2 positions a bottom of the ultra-large copper nut 1 via an internal footing, a top of the ultra-large copper nut 1 is fixed by a puller bolt 3, an aluminium backing plate 4 is provided between the puller bolt 3 and the ultra-large copper nut 1; and the thermal insulation device 2 is made of iron.

Figure 4:
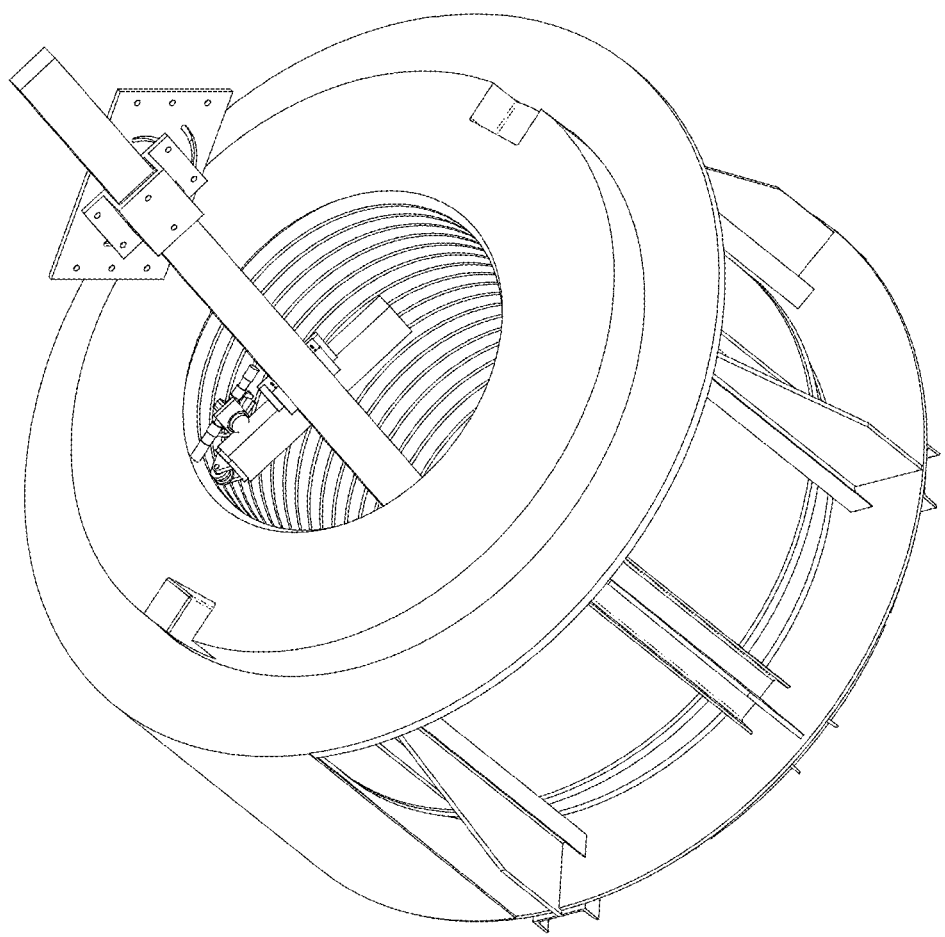
FIG. 4 is a schematic view of the ultra-large copper nut during melting-deposition shaping.

Step (5):

The ultra-large copper nut is preheated. As shown in FIG. 4, the ultra-large copper nut 1 is preheated by a fuel gas preheating method comprising steps of:

step (5.1) heating the ultra-large copper nut 1 for 4 hours at a heating rate of 20° C. per hour; and step (5.2) heating the ultra-large copper nut to a temperature of 280° C. at a heating rate of 50° C. per hour, preserving the temperature, wherein a sum of a heating time and a preserving time is 4 hours.

A ventilating fan for discharging harmful gas is provided on a top portion of the ultra-large copper nut 1; fuel gases utilized are acetylene and oxygen, the fuel gases are injected to a working table via centre-packed rotating joints on a plurality of flame spraying guns, an amount of the flame spraying guns is preferred four, positions of the 4 flame spraying guns quarter cross sections of an internal wall of the ultra-large copper nut, and a water circulation cooling device is provided on the flame spraying gun.

Figure 5:
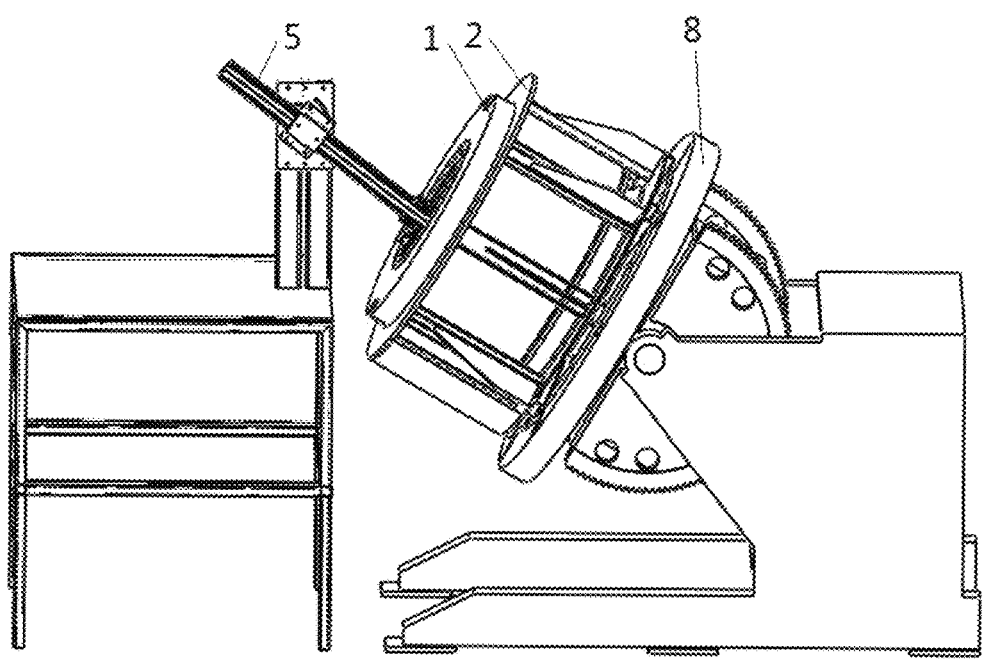
FIG. 5 is a schematic view of loading the ultra-large copper nut by a positioner.

Step (6) Melting-deposition Shaping:

As shown in FIG. 5, the ultra-large copper nut is provided on the positioner 8. A carrying capacity of a positioner 8 should reach 46 tonnes. A welding wire and/or a weld assembly is welded on a damaged region and/or a fracture of the ultra-large copper nut 1, so as to recover a geometrical shape of the ultra-large copper nut and achieve melting-deposition shaping, wherein the welding is performed under protection of an argon gas, and a purity of the argon gas is greater that or equal to 99.98%. The argon gas is spurted via a nozzle, an aperture of the nozzle is 8 mm and a flow of the argon gas is 150 ml/min. The welding method is the MIG method; and the welding wire is the nickel-aluminium bronze welding wire.

The ultra-large copper nut 1 is installed on a positioner 8 for rotating and angular correcting while welding. While welding, the welding torch 5 is fixed on a guide arm having an angle of 45°, an angle of the welding torch 5 is adjustable, the welding torch 5 is connected with a guide wheel 9 for controlling operation track of the welding torch. The positioner 8 finishes rotating and correcting angles of the copper nut during melt welding. During welding, a rotational velocity of the ultra-large copper nut 1 is 260 mm/min, a welding width of the welding torch 5 is 10 mm, a voltage of a deposition line is 20V, a current is at a range of 201.6-202.4 mA and a deposited linear velocity is 260 mm/min.

Figure 6:
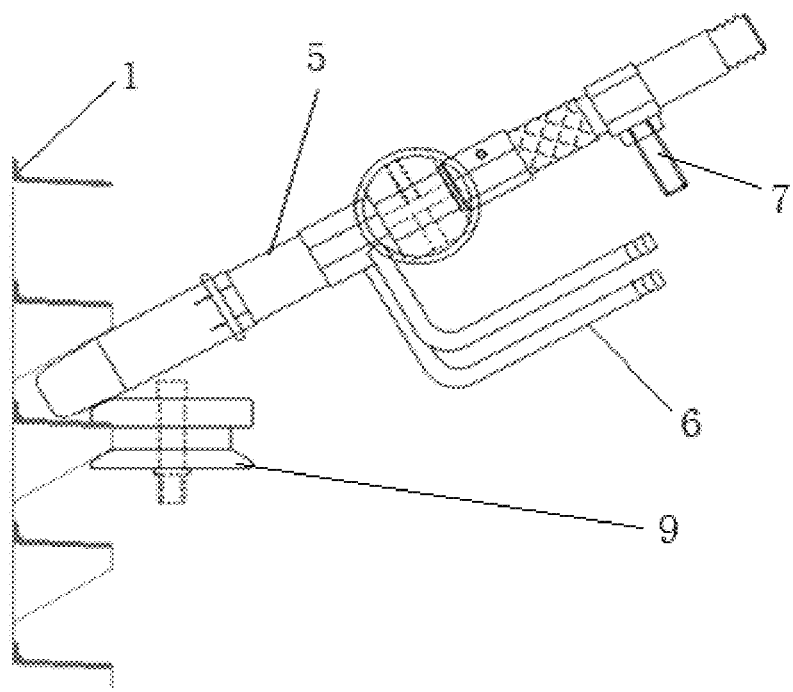
FIG. 6 is a structural schematic view of a welding torch.

A preferred structure of the welding torch 5 is shown in FIG. 6. A duct for argon 7 and a water circulation cooling device 6 are provided on the welding torch 5. A guide wheel 9 is provided on a bottom of the welding torch 5.

Step (7) Post-processing:

Machining and abrasive machining are performed on the ultra-large copper to meet operating requirement, and restoring oil hole 11 which is blocked.

Step (8) Detecting:

Magnetic defect detecting, ultrasonic testing, hardness detecting and geometric parameter detecting are performed on the ultra-large copper nut.

Figure 7:
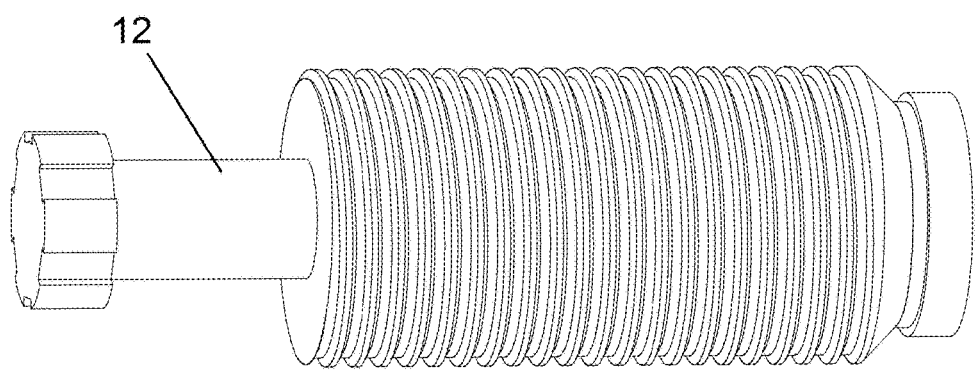
FIG. 7 is a schematic view of a hydraulic screw lever.

As shown in FIG. 7, a hydraulic screw lever 12 has a weight of 26 tones is meshed with a cooper nut with a weight of 38 tones for acceptance and utilization.

In the step (2), a concentration of the sodium hydroxide solution is at a range of 8%-10%, a concentration of the sodium carbonate solution is at a range of 8%-10%. Acetone can replace the odium hydroxide solution to wash helical teeth of the ultra-large copper nut 1.

The centre-packed rotating joints are capable of adjusting a size of the flame, which not only guarantees security of operators, but also ensures uniformly rising of the temperature. Operators are capable of operating on a periphery. Since the temperature I s high, the flame spraying gun is easily damaged to cause danger, a water circulation cooling device is provided on the flame spraying gun, so as to prevent tempering caused by a high temperature or burn out of the flame spraying gun to cause danger. The exhaust fan is capable of discharging harmful gases.

Since the copper nut comprises Al, the conventional oxygen-acetylene brazing, manual welding and direct current TIG are not capable of achieving. Only the TIG and MIG pulse welding types are capable of removing oxidation film on the surface.

MIG welding method is more and more widely applied in welding copper and copper base alloy. The aluminium bronze, silicon bronze and copper-nickel alloy preferably adopt the MIC welding method. The MIG welding method has a high melting-deposition efficiency, a high fusion penetration and a high welding speed (3-4 times of the speed of TIG welding), so as to achieve the requirements of economic benefits of high efficiency, high quality and low cost. Temperatures of copper alloy should meet the preheating requirement of 200-300° C. The method of the present invention combines water, electricity, gas, fire and machine and meanwhile adopts an interchange operation. The method of the present invention has a difficult theory and a refine implement, and thus is convenient for popularization and application. The method of the present invention is an initial trial in remanufacturing the ultra-large cooper and is a major initiative.

The method of the present invention adopts the horizontal-rotating surfacing welding, wherein a turning roll frame is needed to rotate and the heating requirement is difficult to guarantee. The welding torch is fixed on a horizontal guide arm. A disadvantage is that due to the welding channel of the horizontal-rotating welding torch of the cooper nut, the copper liquid builds up welding vertically and is difficult to form. In addition, the cooper nut has a large indentation while rotating on a steel wheel, and the welding quality is difficult to guarantee.

Thus, the positioner 8 is provided to form a position changing and rotating platform. A self-designed attemperator 2 is provided on a periphery of the position changing and rotating platform, so as to guarantee the heating requirements. The welding torch 5 is preferred to be fixed on a guide arm having an angle of 45°. The angle of the welding torch 5 is adjustable. The welding torch 5 has a guide wheel 9 and has a automatic-programming forward and back function to guarantee the moving trajectory of the automatic programming welding. The welding channel is similar to fillet welding in the flat position, and the welding quality has a reliable guarantee.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for remanufacturing an ultra-large copper nut, comprising following steps of:
    step (1) coarsening treatment: washing an oil contamination layer on the ultra-large copper nut with diesel oil, washing a screw tooth surface and a dedendum of the ultra-large copper nut with gasoline; removing oil contamination in an oil hole and washing the oil hole with gasoline; and performing grinding and coarsening on screw teeth of the ultra-large copper nut;
    step (2) purifying treatment: comprising washing the screw teeth of the ultra-large copper nut with acetone or sodium hydroxide solution, and then washing the screw teeth of the ultra-large copper nut with sodium carbonate solution;
    step (3) detecting a material of the ultra-large copper nut comprising detecting materials of the ultra-large copper nut and determining chemical composition of a welding wire according to the material of the ultra-large copper nut;
    step (4) sleeving a thermal insulation device comprising sleeving the thermal insulation device outside the ultra-large copper nut;
    step (5) preheating the ultra-large copper nut comprising preheating the ultra-large copper nut by a fuel gas preheating method comprising steps of:
    step (5.1) heating the ultra-large copper nut for 4 hours at a heating rate of 20° C. per hour; and
    step (5.2) heating the ultra-large copper nut to a temperature at a range of 200° C.-300° C. at a heating rate of 50° C. per hour, preserving the temperature, wherein a sum of a heating time and a preserving time is 4 hours;
    step (6) melting-deposition shaping: comprising welding a welding wire and/or a weld assembly on a damaged region and/or a fracture of the ultra-large copper nut, so as to recover a geometrical shape of the ultra-large copper nut and achieve melting-deposition shaping, wherein the welding is performed under protection of an argon gas, and a purity of the argon gas is greater that or equal to 99.98%;
    step (7) post-processing: comprising performing machining and abrasive machining on the ultra-large copper to meet operating requirement and restoring oil hole which is blocked; and
    step (8) detecting: comprising performing magnetic defect detecting, ultrasonic testing, hardness detecting and geometric parameter detecting on the ultra-large copper nut.

2. The method for remanufacturing the ultra-large copper nut, as recited in claim 1, wherein in the step (6), a welding method is a TIG pulse welding method or a MIG pulse welding method, a welding wire is a nickel-aluminium bronze welding wire or a silicon bronze welding wire, a welding torch is fixed on a guide arm having an angle of 45°, an angle of the welding torch is adjustable, the welding torch is connected with a guide wheel for controlling operation track of the welding torch, a duct for argon and a water circulation cooling device are provided on the welding torch.

3. The method for remanufacturing the ultra-large copper nut, as recited in claim 2, wherein in the step (6), the welding method is the MIG pulse welding method; and the welding wire is the nickel-aluminium bronze welding wire.

4. The method for remanufacturing the ultra-large copper nut, as recited in claim 1, wherein the step (8) further comprises a step of meshing the ultra-large copper nut which passes detections in step (8) with a hydraulic screw lever and performing acceptance tests.

5. The method for remanufacturing the ultra-large copper nut, as recited in claim 1, wherein in the step (4), an insulation separator is provided on a bottom of the thermal insulation device; the thermal insulation device positions a bottom of the ultra-large copper nut via an internal footing, a top of the ultra-large copper nut is fixed by a puller bolt, an aluminium backing plate is provided between the puller bolt and the ultra-large copper nut; and the thermal insulation device is made of iron.

6. The method for remanufacturing the ultra-large copper nut, as recited in claim 1, wherein in the step (5), a ventilating fan for discharging harmful gas is provided on a top portion of the ultra-large copper nut; fuel gases utilized are acetylene and oxygen, the fuel gases are injected to a working table via centre-packed rotating joints on a plurality of flame spraying guns, an amount of the flame spraying guns is four, positions of the four flame spraying guns quarter cross sections of an internal wall of the ultra-large copper nut, and a water circulation cooling device is provided on the flame spraying gun.

7. The method for remanufacturing the ultra-large copper nut, as recited in claim 1, wherein in the sub-step (5.2) of the step (5), the ultra-large copper nut is heated to 280° C. and then performed with heat preservation.

8. The method for remanufacturing the ultra-large copper nut, as recited in claim 1, wherein in the step (6), the ultra-large copper nut is installed on a positioner for rotating and angular correcting while welding; during welding, a rotational velocity of the ultra-large copper nut is 260 mm/min, a welding width of a welding torch is 10 mm, a voltage of a deposition line is 20V, a current is at a range of 201.6-202.4 mA and a deposited linear velocity is 260 mm/min.

9. The method for remanufacturing the ultra-large copper nut, as recited in claim 1, wherein in the step (6), while welding, a purity of the argon gas is 99.98%, the argon gas is spurted via a nozzle, an aperture of the nozzle is 8 mm and a flow of the argon gas is 150 ml/min.

10. The method for remanufacturing the ultra-large copper nut, as recited in claim 1, wherein in the step (2), a concentration of the sodium hydroxide solution is at a range of 8%-10%, a concentration of the sodium carbonate solution is at a range of 8%-10%; and in the step (6), the welding adopts a horizontal-rotating surfacing welding.

\* \* \* \* \*